(12) United States Patent
Parrish (10) Patent No.: US 7,649,731 B2
(45) Date of Patent: Jan. 19, 2010

(54) POWER DISTRIBUTION MODULE USING BUSS BAR

(75) Inventor: Jeffrey David Parrish, Westland, MI (US)

(73) Assignee: Tyco Electronics Corporation, Middletown, PA (US)

( * ) Notice: Subject to any disclaimer, the term of this patent is extended or adjusted under 35 U.S.C. 154(b) by 374 days.

(21) Appl. No.: 11/700,990

(22) Filed: Jan. 31, 2007

(65) Prior Publication Data

US 2008/0180884 A1    Jul. 31, 2008

(51) Int. Cl.
*H02B 1/26* (2006.01)
*H05K 1/00* (2006.01)

(52) U.S. Cl. ................ 361/624; 361/622; 174/254; 439/76.2; 439/949

(58) Field of Classification Search ............... 361/622, 361/624, 626, 775; 174/254; 439/76.2, 721–722, 439/949
See application file for complete search history.

(56) References Cited

U.S. PATENT DOCUMENTS

| | | | | |
|---|---|---|---|---|
| 4,772,864 A | * | 9/1988 | Otto et al. | 333/238 |
| 5,160,274 A | * | 11/1992 | Ozaki et al. | 439/212 |
| 5,309,327 A | * | 5/1994 | Slater | 361/805 |
| 5,322,445 A | * | 6/1994 | Ozaki et al. | 439/212 |
| 5,474,475 A | * | 12/1995 | Yamaguchi | 439/620.27 |
| 5,530,625 A | * | 6/1996 | VanDerStuyf et al. | 361/794 |
| 5,715,135 A | * | 2/1998 | Brussalis et al. | 361/624 |
| 5,831,814 A | * | 11/1998 | Hamill | 361/627 |
| 6,015,302 A | | 1/2000 | Butts et al. | |
| 6,325,640 B1 | * | 12/2001 | Kasai | 439/76.2 |
| 6,353,190 B1 | * | 3/2002 | Sumida et al. | 174/261 |
| 6,354,868 B1 | | 3/2002 | Korczynski et al. | |
| 6,383,035 B1 | * | 5/2002 | Kasai | 439/724 |
| 6,468,091 B2 | * | 10/2002 | Roussel et al. | 439/72 |
| 6,493,234 B2 | * | 12/2002 | Sunami et al. | 361/752 |
| 6,613,988 B2 | * | 9/2003 | Powers | 174/261 |
| 6,661,672 B2 | * | 12/2003 | Ito | 361/752 |
| 6,846,183 B2 | * | 1/2005 | Kato et al. | 439/20 |
| 6,850,421 B2 | | 2/2005 | Boyd | |
| 7,072,188 B2 | | 7/2006 | Janisch | |
| 7,364,449 B2 | * | 4/2008 | Makino | 439/212 |
| 2007/0010112 A1 | * | 1/2007 | Makino | 439/76.2 |

FOREIGN PATENT DOCUMENTS

WO    WO 2004102746 A1 *  11/2004

* cited by examiner

*Primary Examiner*—Jayprakash N Gandhi
*Assistant Examiner*—Robert J Hoffberg (57) ABSTRACT

A power distribution module includes a housing having multiple channels, and a plurality of buss bars received within the housing for distributing power between multiple electrical components. The buss bars have terminals that are selectively positionable within respective ones of the channels based on a predetermined arrangement of the electrical components.

18 Claims, 6 Drawing Sheets

POWER DISTRIBUTION MODULE USING BUSS BAR

BACKGROUND OF THE INVENTION

This invention relates generally to power distribution modules, and more particularly, to power distribution to electrical components within the power distribution module.

Electrical systems, such as vehicle electrical systems, typically include a power distribution module. The power distribution module includes a base which houses multiple electrical components, such as electrical fuses, relays and diodes. Placement of the electrical components in the base may be provided in engineering specific areas of the base for a specific fuse, relay or diode component. Based on the specific placement of the components, a wiring scheme is developed and the components are wired according to that scheme. Accordingly, wires and/or wire harnesses are used to interconnect the electrical components with each other and with other electronics within the vehicle electrical system.

One problem associated with known power distribution modules is that wiring the various electrical components has become difficult. Both the compact size and the increase in the number of electrical components housed within the typical power distribution module lead to the wiring difficulties. Additionally, mounting the power distribution modules has become difficult due to the bulk of the wires around the base. Another problem associated with known power distribution modules is that the wiring of individual electrical components may be time consuming. For example, when interconnecting multiple electrical components, many wire splices may be required. Each wire splice is a time consuming process.

A further problem associated with known power distribution modules is the difficulty of making changes to component placement and/or component wiring placement in the base. For example, changes may require reconfiguration of the entire base and/or wiring scheme. Because of the limited reconfiguration potential of known power distribution modules, the modules are typically vehicle specific. Consequently, a module for a specific vehicle model with a fixed configuration of electrical components and wiring scheme for that specific vehicle model usually cannot be used in a different vehicle model as that second vehicle model may have a different set of fuses, relays and diodes. A new base for the electrical components and/or wiring scheme must be engineered.

Thus, a power distribution module that allows for flexible component placement throughout the housing is needed. Additionally, a power distribution module that reduces set-up time and complexity is needed.

BRIEF DESCRIPTION OF THE INVENTION

In one aspect, a power distribution module is provided including a housing having multiple channels, and a plurality of buss bars received within the housing for distributing power between multiple electrical components. The buss bars have terminals that are selectively positionable within respective ones of the channels based on a predetermined arrangement of the electrical components.

In another aspect, a power distribution module for distributing power to multiple electrical components is provided, wherein the power distribution module includes a housing defining multiple component areas configured to receive respective ones of the components in a predetermined arrangement. The housing has a matrix of channels, wherein at least one channel is positioned in each component area. The channels are configured to receive respective ones of the components. The power distribution module also includes a buss bar having terminals being received within the channels of at least two component areas. The buss bar is selectively positionable within the housing based on the arrangement of the components for interconnecting respective ones of the components.

DETAILED DESCRIPTION OF THE INVENTION

Figure 1:
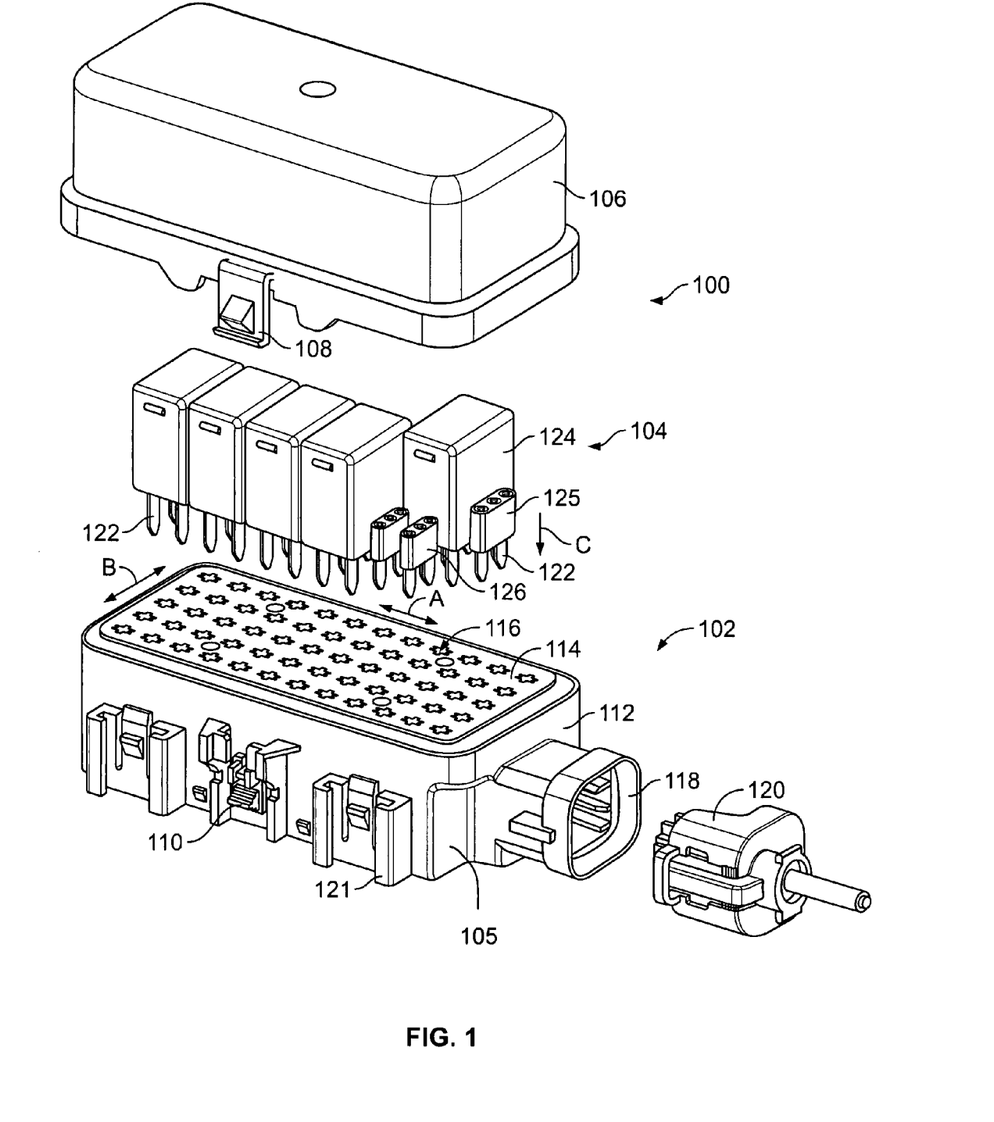
FIG. 1 is an exploded view of power distribution assembly formed in accordance with an exemplary embodiment.

FIG. 1 is an exploded view of power distribution assembly 100 formed in accordance with an exemplary embodiment. The power distribution assembly 100 is illustrated as being a fuse and/or relay box, such as for a vehicle electrical system. However, the power distribution assembly 100 may have other forms and functions in alternative embodiments, and the power distribution assembly 100 illustrated in the figures is merely illustrative.

The power distribution assembly 100 includes a power distribution module 102 for distributing power to multiple electrical components 104. The power distribution module 102 includes a base 105 and a cover 106 attached to the base 105. The cover 106 is provided to enclose the electrical components 104 when assembled to the base 105. In an exemplary embodiment, the cover 106 includes tabs 108 extending from both sides of the cover 106. The tabs 108 engage corresponding latches 110 of the base 105 for securing the cover 106 to the base 105. Other alternative coupling configurations may be used in alternative embodiments, such as hingedly coupling the cover 106 to one side of the base 105, or using other locking mechanisms. The cover 106 is sized to accommodate various types of electrical components 104, such as relays, fuses, diodes and the like.

The base 105 of the power distribution module 102 includes a housing 112 having a component interface 114 for receiving the electrical components 104 thereon. The component interface 114 is generally planar and located on a top of the base 105. Different component interfaces 114 may be provided on the base 105 in alternative embodiments. A plurality of channels 116 open to the component interface 114 for receiving contact portions of the electrical components 104. In an exemplary embodiment, the channels 116 are arranged in a predetermined pattern, such as a grid pattern, having common spacing therebetween in both a longitudinal direction and a lateral direction, shown by arrows A and B, respectively. The common spacing allows placement of the electrical components 104 in multiple positions. As will be explained in further detail below, in an exemplary embodiment, each electrical component 104 is located in a different component area of the component interface 114. While the power distribution module 102 is illustrated as having the longitudinal spacing, or spacing along the longitudinal direction, the same as the lateral spacing, or spacing along the lateral direction, the longitudinal spacing may be different than the lateral spacing in alternative embodiments. In other alternative embodiments, the longitudinal and/or lateral spacing may be varied in different component areas of the power distribution module 102, such as to accept different types of electrical components 104 within a given component area. In an exemplary embodiment, the power distribution module 102 includes a power connector port 118 extending from a side thereof. The power connector port 118 receives a power connector 120 therein, which supplies power to the power distribution module 102, as will be explained in more detail below. The base 105 of the power distribution module 102 may include mounting brackets 121 for mounting the power distribution module 102 to another structure, such as the vehicle.

The electrical components 104 each include blade contacts 122 extending downward from each of the electrical components 104. The electrical components 104 are represented in FIG. 1 by relays 124, fuses 125, and diodes 126. The number, shape, size and positioning of the relays, fuses and diodes 124, 125, 126 may vary in other embodiments and depend upon the particular application for the power distribution assembly 100. The channels 116 are sized and shaped to received the blade contacts 122 therein. Optionally, the channels 116 are sized and shaped to be adaptable to receive different types and/or sizes of contacts therein. During assembly, the electrical components 104 are oriented such that the blade contacts 122 face the component interface 114. The blade contacts 122 are then loaded into the channels 116 in a loading direction, shown generally by arrow C. The position of each electrical component 104 with respect to each other and with respect to the power distribution module 102 depends upon a power distribution scheme for the particular application.

Figure 2:
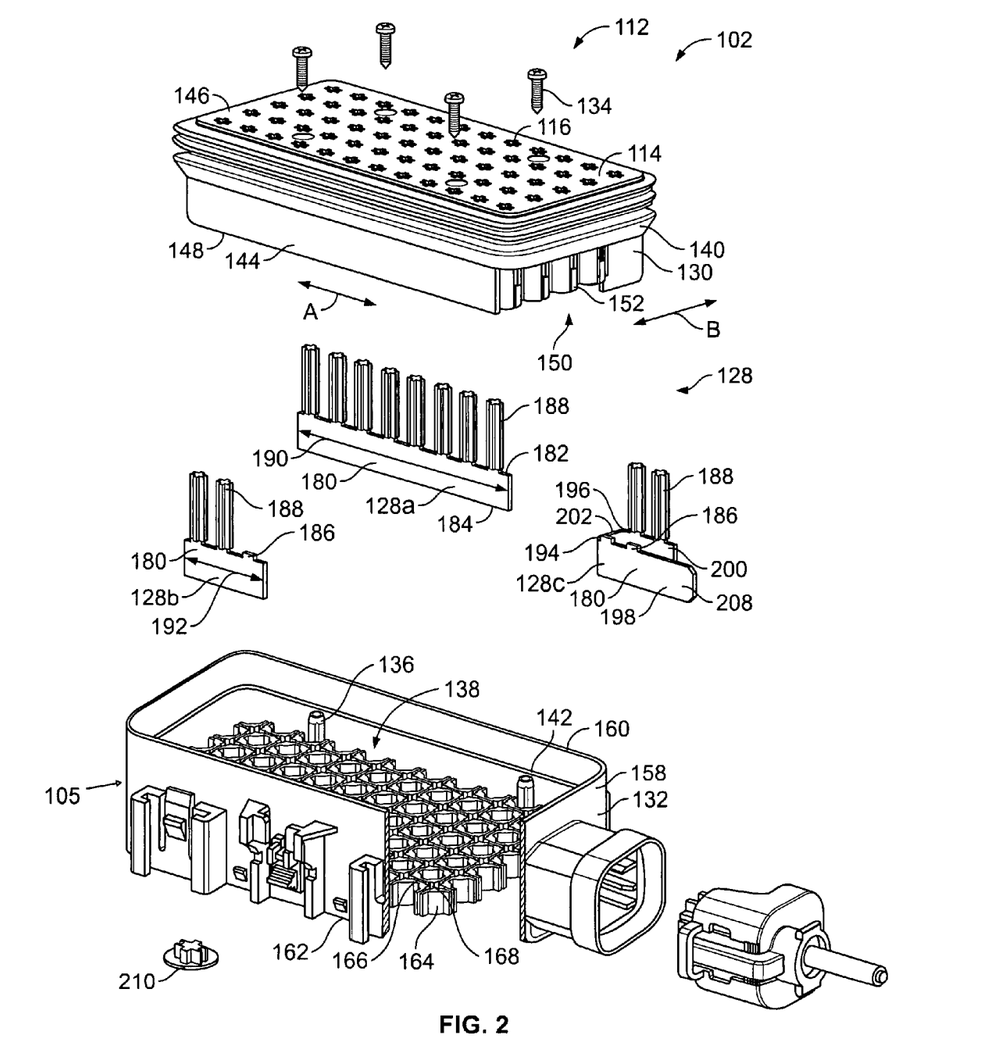
FIG. 2 is an exploded view of a portion of a power distribution module for the assembly shown in FIG. 1 and formed in accordance with an exemplary embodiment.

FIG. 2 is an exploded view of a portion of the power distribution module 102 formed in accordance with an exemplary embodiment. The power distribution module 102 includes the base 105 and a plurality of buss bars 128 received within respective channels 116 of the base 105. The housing 112 of the base 105 includes an upper housing 130 and a lower housing 132. The channels 116 extend through both the upper and lower housings 130, 132. As will be explained in more detail below, the channels 116 are exposed along a top of the upper housing 130 and a bottom of the lower housing 132, such that both ends of the channels 116 may be accessed from the exterior of the power distribution module 102. In an exemplary embodiment, the upper and lower housings 130, 132 are coupled to one another by fasteners 134 that are secured to fastening posts 136 within the lower housing 132, however other suitable means of fastening the upper housing 130 to the lower housing 132 would be available to those skilled in the art. The lower housing generally defines a cavity 138. At least a portion of the upper housing 130 is received within the cavity 138 when the upper and lower housings 130, 132 are coupled to one another. A seal 140 is provided between the upper and lower housings 130, 132. The seal 140 may extend around the perimeter of the upper housing 130 and engage the lower housing 132 during assembly. Optionally, the lower housing 132 may include a ridge 142 extending on the interior thereof. The upper housing 130 and/or the seal 140 may seat against the ridge 142 during assembly.

The upper housing 130 includes sides 144 extending between a top 146 and a bottom 148. The top 146 defines the component interface 114. The channels 116 are formed by upper channel portions 150 that extend entirely between the top 146 and the bottom 148 of the upper housing 130. A portion of one of the sides 144 is removed in FIG. 2 to illustrate the upper channel portions 150. Each upper channel portion 150 includes slots 152 interconnecting adjacent upper channel portions 150. The slots 152 open to the channels 116 and extend in both longitudinal and lateral directions (arrows A and B, respectively). Each slot 152 opens to the bottom 148 and is configured to receive one of the buss bars 128 therein, as will be described in further detail below. In the illustrated embodiment, the outer surface of the upper channel portions 150 have a generally circular cross-section, however other shapes may be used in alternative embodiments.

The lower housing 132 includes sides 158 extending between a top 160 and a bottom 162. The top 160 defines the cavity 138 which may receive at least a portion of the upper housing 130. Lower channel portions 164 extend upward from the bottom 162 into the cavity 138. Each lower channel portion 164 is aligned with a corresponding upper channel portion 150. Once assembled, the upper and lower channel portions 150, 164 cooperate to form the channels 116. The upper and lower channel portions 150, 164 are sized to define the channels 116 therein and/or to insulate adjacent channels 116 from one another. A portion of one of the sides 158 is removed in FIG. 2 to illustrate the lower channel portions 164. Each lower channel portion 164 includes slots 166 opening to adjacent lower channel portions 164. The slots 166 open to the channels 116 and extend in both longitudinal and lateral directions. Each slot 166 opens to a top surface 168 of the lower channel portions 164 and is configured to receive one of the buss bars 128 therein, as will be described in further detail below. The buss bars 128 are sized to fit within respective portions of the slots 152 and 166 when the slots 152 and 166 are aligned. The outer surface of the lower channel portion 164 has a generally circular cross-section, however other shapes may be used in alternative embodiments. While the base 105 of the power distribution module 102 has been described as including an upper housing 130 and a lower housing 132, it is realized that the base may include a single housing having channels therethrough. It is also realized that while the base 105 has been described as including upper and lower channel portions 150 and 164, it is realized that the upper and lower housings 130, 132 may include a solid block of material having the channels and/or slots extending therethrough. The upper and lower channel portions 150 and 164 may be provided for ease of manufacture and/or for reduced product cost.

The number and configuration of buss bars 128 are dependent on the configuration of the power distribution module 102 for a specific application. However, it is anticipated that a particular arrangement of buss bars 128 may be used for more than one power distribution module 102 configuration. For example, the exemplary embodiment of FIG. 2 shows three buss bars in three different configurations, however, for other applications, the power distribution module 102 may have a different configuration of components and the number of bus bars 128 and the configuration of each bus bar 128 may vary. In the embodiment of FIG. 2, each buss bar 128 includes an elongated base strip 180 having a top 182 and a bottom 184. Tabs 186 extend from the top 182 at regular intervals. The tabs 186 are integrally formed with the base strip 180. In an exemplary embodiment, the base strip 180 and the tabs 186 are stamped from a metal stock into a predetermined length. The lengths of the buss bars 128 may vary, depending on the particular application. The buss bars 128 also include conductive terminals 188 that are coupled to the tabs 186. In the illustrated embodiment, the terminals 188 are generally cross-shaped. The terminals 188 include female connections at both ends to receive the tabs 186 at one end and the blade contacts 122 at the other end. Conductive paths are created between the terminals 188 and the base strip 180 via the tabs 186. The terminals 188 have a predetermined shape and size to fit within the channels 116. When loaded into the channels 116, the terminals 188 are positioned to engage the blade contacts 122 (shown in FIG. 1) of the electrical components 104 (shown in FIG. 1). Each electrical component 104 engaging one of the terminals 188 of the buss bar 128 is electrically coupled on a common circuit via the buss bar 128. As such, the buss bar 128 may be used to distribute power to multiple electrical components 104 by interconnecting the terminals 188 of the buss bar 128 with the blade contacts 122 of the electrical components 104. Depending on the length of the buss bar 128, and the number of terminals 188 extending therefrom, any number of electrical components 104 may be interconnected in a reliable manner.

Three buss bars 128 are illustrated in FIG. 2, namely first, second and third buss bars 128a, 128b and 128c. The first buss bar 128a extends along a single longitudinal axis for a length 190. Buss bar 128a is illustrated as including eight terminals 188 at equal spacing. The spacing corresponds to the lateral spacing between the channels 116 such that the terminals 188 may be received therein. It is realized that more or less than eight terminals 188 may be provided, and the spacing between the terminals may be unequal.

The second and third buss bars 128b and 128c have at least one of the terminals 188 removed for clarity to illustrate the tabs 186. Optionally, the buss bars 128b and 128c may be loaded into the housing 112 with at least one exposed tab 186, wherein the respective terminal 188 is not mated thereto. For example, when an electrical component 104 is not to be included within the channel 116 associated with the exposed tab 186, the tab 186 may be exposed. In an exemplary embodiment, each tab 186 would have a corresponding terminal 188 coupled thereto prior to assembly. The second buss bar 128b extends along a single longitudinal axis for a length 192. The length 192 is shorter than the length 190 of the first buss bar 128a and includes less terminals 188 coupled thereto. The spacing between the terminals 188 is the same as the spacing between the terminals 188 of the first buss bar 128a. As such, the housing 112 may include channels 116 of uniform spacing, and the buss bars 128a and 128b may be loaded into multiple different positions, depending on the positioning of the electrical components 104 on the component interface 114. Consequently, not only can you have different configurations of buss bars 128 for different applications but you can also move existing buss bars 128 to a different sub-set of channels 116 within the power distribution module 102 when changing the configuration of the electrical components 104.

The third buss bar 128c has a different shape then either of the other buss bars 128a or 128b. The buss bar 128c includes a first bend 194 and a second bend 196, thus giving the buss bar 128c a U-shape with first and second longitudinal portions 198 and 200. The first and second longitudinal portions 198, 200 extend parallel to one another. A transverse portion 202 extends between the first and second longitudinal portions 198, 200. The third buss bar 128c may thus be used to interconnect electrical components 104 (shown in FIG. 1) mounted within different rows of the channels 116. In the illustrated embodiment, the third buss bar 128c includes a power connector interface 208. The power connector interface 208 extends from an end of the base strip 180 and is positioned to engage the power connector 120 when assembled. Optionally, the power connector interface 208 may extend into the power connector port 118 to engage the power connector 120. The power connector interface 208 is conductive and distributes the power from the power connector 120 to the base strip 180. The power is then distributed to the terminals 188 and the corresponding blade contacts 122. Optionally, the power connector interface 208 may be integrally formed with the base strip 180. In one embodiment, the power connector interface 208 is formed by removing the tabs 186 from the end of the base strip 180.

During assembly of the power distribution module 102, the buss bars 128 are assembled and positioned with respect to the upper and lower housings 130, 132. The buss bars 128 are positioned in predetermined positions depending on the particular electrical component layout. The buss bars 128 are loaded into the upper channel portions 150 such that the terminals 188 are loaded into the channels 116 and the base strips 180 extend through the slots 152 between adjacent upper channel portions 150. The sub-assembly of the upper housing 130 and the buss bars 128 may be loaded into the lower housing 132 and the fasteners 134 may be tightened to secure the upper and lower housings 130, 132 together. Optionally, a portion of the base strips 180 may extend below the bottom 148 of the upper housing 130 for loading into the slots 166 of the lower housing 132. An alternative assembly process may include loading the buss bars 128 into the lower housing 132 and then mounting the upper housing 130 to the sub-assembly of the lower housing 132 and the buss bars 128. Once the housing 112 is assembled, the power connector 120 is connected to the power connector port 118. The electrical components 104 are mounted to the housing 112 according to the predetermined electrical component layout, wherein the electrical components 104 are positioned in predetermined component areas. The buss bars 28 are used to distribute power to multiple components within multiple component areas. For example, a single buss bar, such as the first buss bar 128a, may be used to distribute power to eight electrical components 104. Optionally, an additional assembly process may include providing plugs 210 within the channels 116, such as at the bottom of the channels 116, to seal the channels 116. The plugs 210 may be sized and shaped to securely fit within the channels 116 and seal the channels 116 from contaminants in the surrounding environment, such as dirt, oil, water and the like. Optionally, connecting elements (not shown) other than the buss bars 128 may be used to interconnect various ones of the electrical components 104. For example, jumper wires and/or wire harnesses, such as those that would be available to those in the art, may be used to interconnect at least some of the electrical components and distribute power therebetween. The jumper wires and/or wire harnesses may be received within the channels 116 in a predetermined arrangement.

Figure 3:
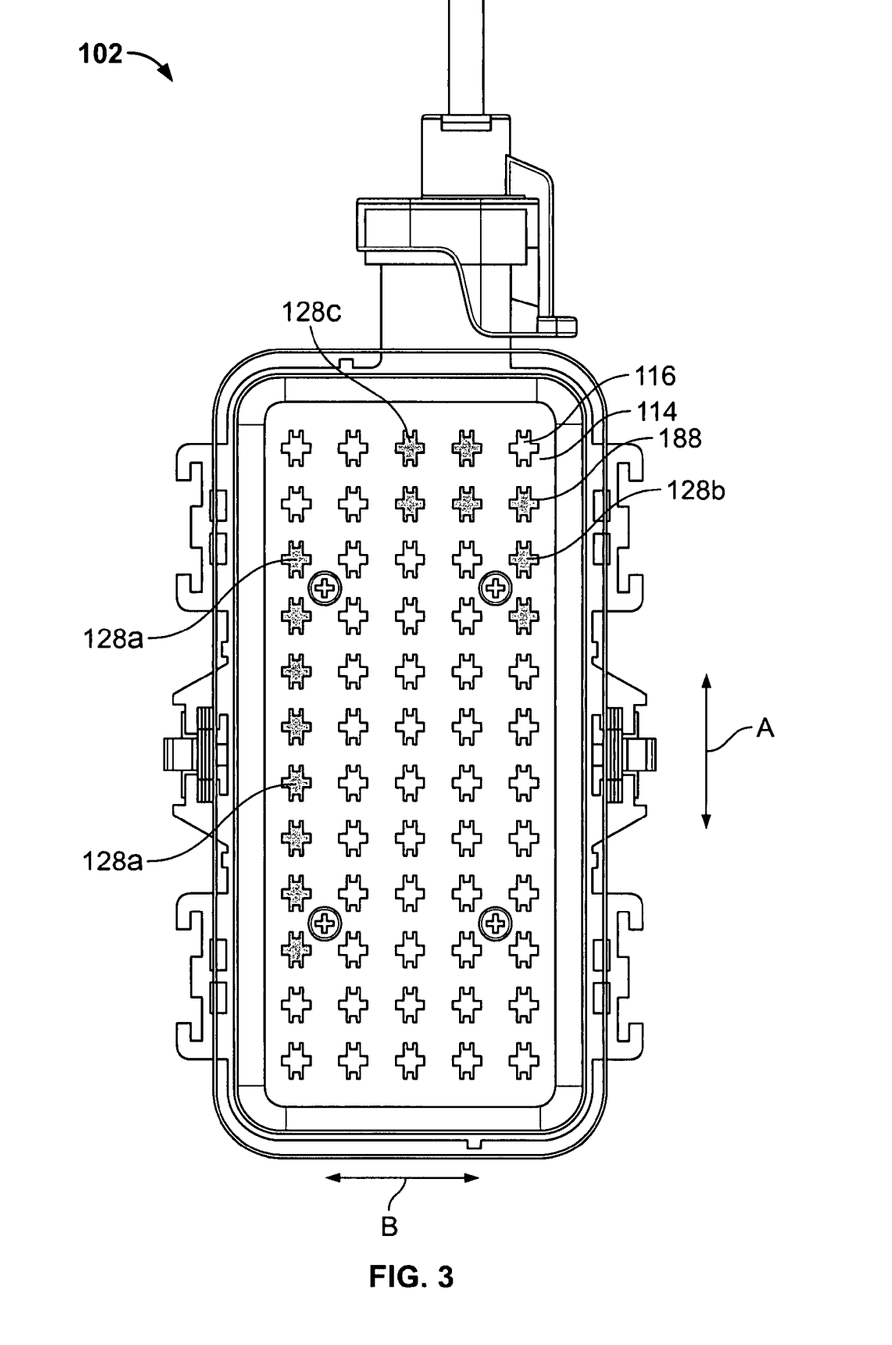
FIG. 3 is a top view of a component interface of the power distribution module shown in FIG. 2.

FIG. 3 is a top view of the component interface 114 of the base 105 of the power distribution module 102. The channels 116 are arranged in a grid pattern of rows and columns, wherein the columns extend along a longitudinal direction (arrow A) and the rows extend along a lateral direction (arrow B). The channels 116 extend entirely through the housing 112 and can be accessed from the top (e.g. the component interface 114) and the bottom of the housing 112. The size and the shape of the openings defining the channels 116 are selected to accept the terminals 188 as well as the blade contacts 122 (shown in FIG. 1). The openings of the channels 116 may be tapered. The buss bars 128a, 128b and 128c are illustrated in FIG. 3 in predetermined positions based on a particular power distribution scheme. The power distribution scheme depends on the layout of the electrical components 104 (shown in FIG.

1) that are used with the power distribution module 102. An exemplary power distribution scheme is illustrated below with respect to FIG. 4.

Figure 4:
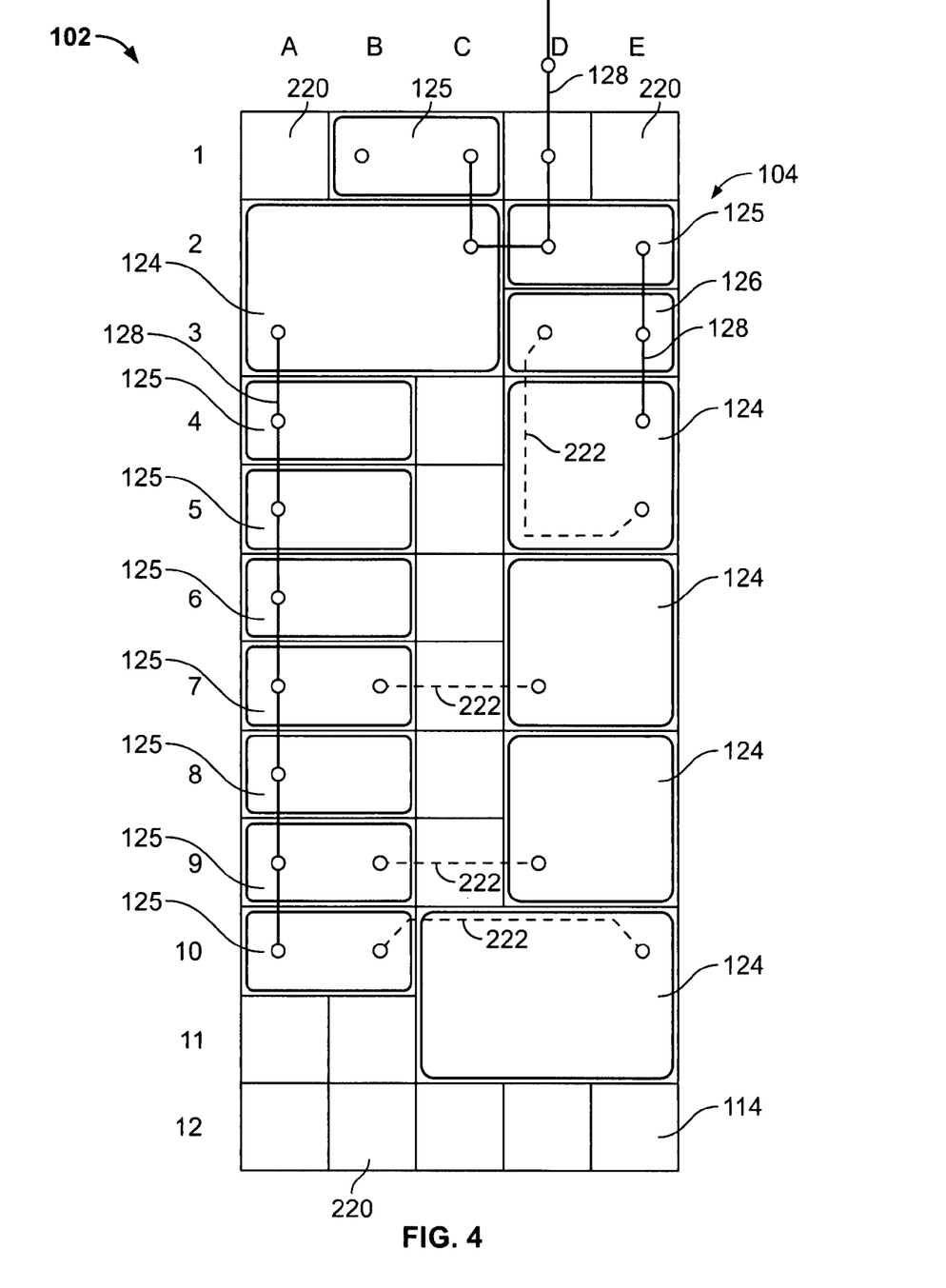
FIG. 4 schematically illustrates a power distribution scheme for the assembly shown in FIG. 1.

FIG. 4 illustrates a power distribution scheme in accordance with an exemplary embodiment. The electrical components 104 are arranged along the component interface 114 in a predetermined layout. The buss bars 128 interconnect certain ones of the electrical components 104 according to the power distribution scheme. Different layouts may be used in different applications, such as in different vehicles, or when different devices are used within the electrical system. A different layout may require different positioning of the electrical components 104 and/or the buss bars 128. In the illustrated embodiment, the electrical components 104 are represented by relays 124, fuses 125 and diodes 126. The relays 124 may be mini-relays, micro-relays, and the like. The relays 124, fuses 125 and/or diodes 126 may be used in connection with certain devices within the vehicle electrical system, such as the lights, the air conditioner, the ignition, the ignition coil, the fan, the fuel pump, and the like. Other types of electrical systems may include other types of devices.

The component interface 114 has multiple cells 220 arranged in a grid of rows R1-R12 and columns A-E. The layout of the cells corresponds to the layout of openings 116 (shown in FIG. 1), wherein one opening 116 is located within each cell 220 of the grid. Each component area includes more than one cell 220. For example, for one of the fuses 125 or one of the diodes 126, the component area includes two cells 220 within the same row. For a micro-version of one of the relays 124, the component area includes four cells 220 with two cells 220 in a first row and two more cells 220 in an adjacent row. For a mini-version of one of the relays 124, the component area includes six cells 220 with three cells 220 in a first row and three more cells 220 in an adjacent row. Other cell configurations are possible in alternative embodiments. Numerous cells 220 may be unused and may not form part of any component area.

In the illustrated embodiment, the first, second and third buss bars 128a, 128b and 128c are used to distribute power to the various electrical components 104. The third buss bar 128c is directly connected to the power source, and distributes power to two fuses 125 and a relay 124. The second buss bar 128b is connected to one of the fuses 125 that is powered by the buss bar 128c. Thus, the second buss bar 128b is powered by the common fuse 125. The second buss bar 128b is also connected to a diode 126 and a relay 124. The first buss bar 128a is connected to the relay 124 that is powered by the buss bar 128c. The first buss bar 128a is also connected to seven fuses 125. As further illustrated in FIG. 4, a plurality of jumper wires 222 are used to distribute power between some of the electrical components 104. In an exemplary embodiment, the jumper wires 222 are used to interconnect two electrical components 104, and the buss bars 128 are used to interconnect more than two electrical components 104. However, buss bars 128 may be used to connect only two electrical components 104 in alternative embodiments. The jumper wires 222 include a contact (not shown) at the end of the wire that is received in the channels 116 in a similar manner as the terminals 188. The jumper wire contacts are loaded into the channels 116 through the bottom of the housing 112 (shown in FIG. 1), and the wires remain on the exterior of the housing 112. The contacts of the jumper wires 222 engage the blade contacts 122 (shown in FIG. 1) to create a conductive path therebetween.

Figure 5:
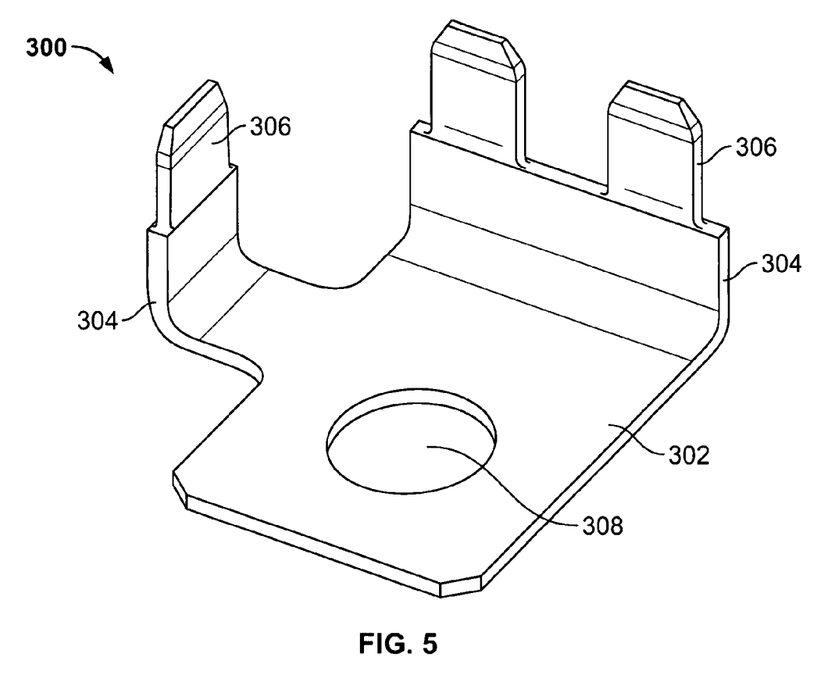
FIG. 5 illustrates an alternative power connection buss bar for an alternative power distribution module.

FIG. 5 illustrates an alternative power connection buss bar 300 for an alternative configuration of the power distribution module. The buss bar 300 may be used to directly connect to a power source in a different manner than described above with respect to the power connector interface 208 of the buss bar 128c (shown in FIG. 2). More particularly, the buss bar 300 connects to a different type of power connector than the power connector 120.

The buss bar 300 includes a planar base 302 and strips 304 extending transversely from the base 302. Tabs 306 extend from the strips 304 in a similar manner as the tabs 186 (shown in FIG. 2) extend from the base strips 180 (shown in FIG. 2). Terminals (not shown), similar to the terminals 188 (shown in FIG. 2) are coupled to the tabs 306 and are loaded into channels of a housing in a similar manner as described above. The tabs 306 may have the same spacing as the tabs 186. The strips 304 may have any length and may include any number of tabs 306. For example, the buss bar 300 illustrated in FIG. 5 includes one strip 304 having a length sufficient to accommodate a single tab 306 and another strip 304 having a length sufficient to accommodate two tabs 306. The base 302 includes an opening 308 used to couple the buss bar 300 to a power connector (not shown). For example, the power connection may be provided using a bolt or stud that extends through the buss bar 300 and engages the buss bar 300 at the opening 308. The power connection may be made through a bottom of a housing (not shown) retaining the buss bar 300.

Figure 6:
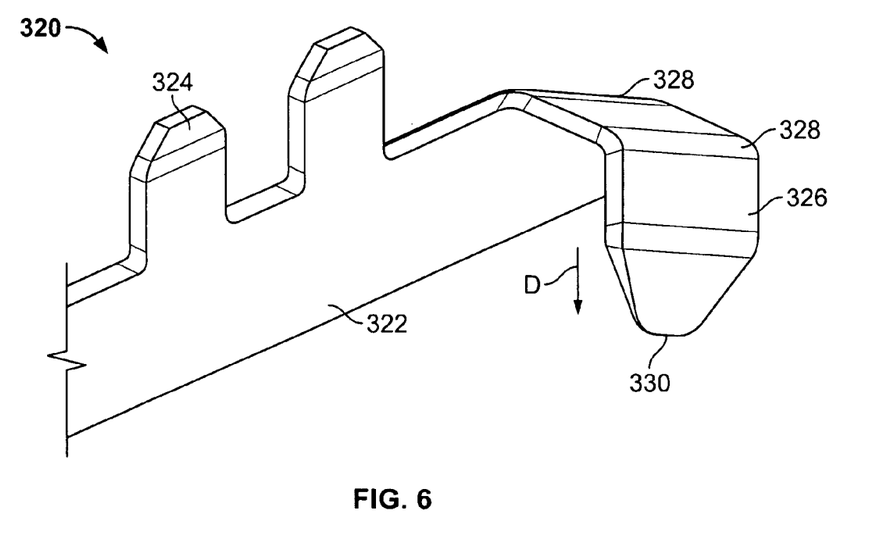
FIG. 6 illustrates another alternative power connection buss bar for an alternative power distribution module.

FIG. 6 illustrates a portion of another alternative power connection buss bar 320 for an alternative configuration of the power distribution module. The buss bar 320 includes a base strip 322 and tabs 324 extending upward from the base strip 322. A power connector interface 326 is positioned at an end of the buss bar 320. The power connector interface 326 includes two bends 328 such that a distal end 330 of the power connector interface 326 faces generally opposed to the direction of the tabs 324, shown by the arrow D. Optionally, the bends 328 may be approximately 45 degree bends. The power connector interface 326 is integrally formed with the base strip 322 and may be directly connected to a power connector, such as at a bottom of a housing (not shown) retaining the buss bar 320.

Figure 7:
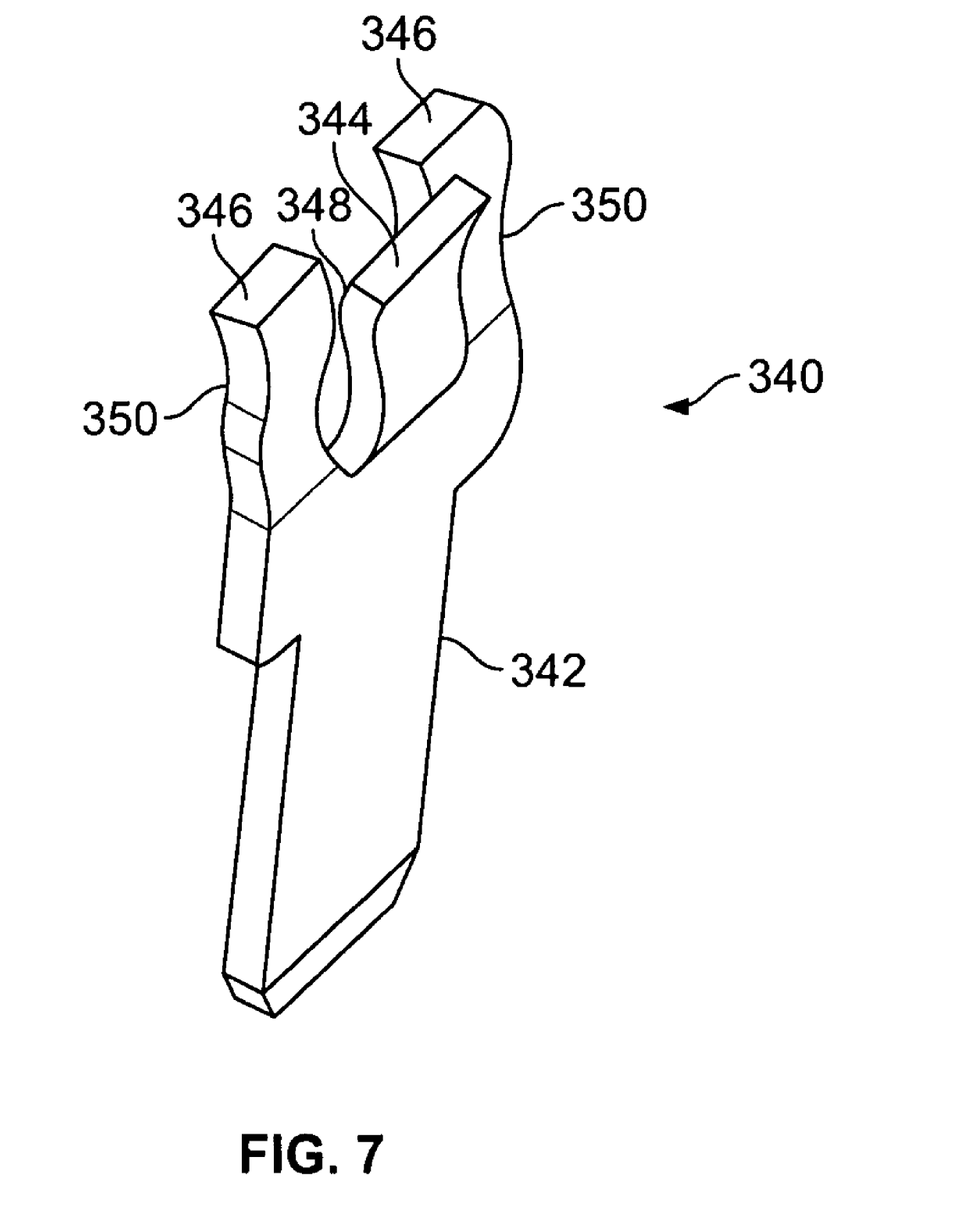
FIG. 7 illustrates an auxiliary connector for an alternative power distribution module.

FIG. 7 illustrates an auxiliary connector 340 for a power distribution module. The auxiliary connector 340 includes a body section 342, a center contact beam 344 extending downward from the body section 342 and first and second outer contact beams 346 extending from the body section 342 on either side of the center contact beam 344. The contact beams 344, 346 are constructed to pass over a planar conductive body. For example, the connector 340 may be used in lieu of the tabs 186 and terminals 188 (both shown in FIG. 2) by connecting directly to the base strip 180 (also shown in FIG. 2) to extend into the channels 116 and engage the blade contacts 122 (both shown in FIG. 1). Specifically, the contact beams 344, 346 pass over opposed sides of the base strip 180, and make electrical connection thereto via a contact normal force imposed by the deflection of the beams against the base strip 180. Alternatively, the connector 340 may be used as a power connector and connect to the base strip 180 to interconnect the base strip 180 and the power connector 120 (shown in FIG. 1).

In the illustrated embodiment, the body section 342 is generally planar and rectangular. However, the body section 342 may have another shape, such as a shape similar to the terminals 188. The center contact beam 344 extends obliquely to the body section 342 and includes a rounded contact surface 348 which engages one of the sides of the planar conductive body. The contact beams 346 also extend obliquely to the body section 342 and include rounded contact surfaces 350 which engage a surface of the planar conductive body. In an exemplary embodiment, the center contact beam 344 and the outer contact beams 346 are angled in opposing directions from one another, and the beams 344, 346 are deflected in opposite directions when they are inserted over the planar conductive body.

A power distribution module 102 is thus provided for distributing power to multiple electrical components 104 in a cost effective and reliable manner. The power distribution module 102 includes a base 105 having a plurality of channels 116 extending therethrough. A plurality of buss bars 128 are mounted within respective ones of the channels 116 according to a predetermined power distribution scheme The buss bars 128 have conductive terminals 188 that are positioned within the channels 116 and that engage blade contacts 122 of the electrical components. Power is supplied to the buss bars 128, which then distribute the power to the electrical components 104. The buss bar 128 are thus used to interconnect the electrical components 104. The buss bars 128 may be selectively positioned within the housing 112 based on the layout of the electrical components 104. Thus, when the layout of the electrical components changes, the positions of the buss bars 128 may be changed to accommodate the new layout. For example, the buss bars may be removed and moved to new positions for engaging a different arrangement of electrical components, but still within the same base 105. Additionally, the same base 105 may be used to accommodate many different electrical component layouts because the positions of the buss bars 128 may be easily changed. Furthermore, the size and shape of the buss bars 128 may be selected to distribute power to any number of electrical components 104, thus reducing set-up time and cost as compared to traditional wire splicing in conventional power distribution modules. However, the power distribution module 102 is designed to accommodate jumper wires and/or wire harnesses for interconnecting electrical components 104.

While the invention has been described in terms of various specific embodiments, those skilled in the art will recognize that the invention can be practiced with modification within the spirit and scope of the claims.

What is claimed is:

1. A power distribution module comprising:
   a housing having multiple channels;
   a plurality of buss bars received within the housing for distributing power between multiple electrical components, the buss bars include a base strip with multiple mounts; and
   terminals coupled to selected ones of the mounts such that the terminals are selectively positionable within respective ones of the channels based on a predetermined arrangement of the electrical components wherein the housing extends along a longitudinal axis and a lateral axis, the housing includes slots extending between and open to the channels in both longitudinal directions and in lateral directions, the base strips being received within corresponding slots and wherein each of the base strips extends in the longitudinal direction, in the lateral direction, or in both the longitudinal and the lateral directions.

2. A power distribution module in accordance with claim 1, wherein each buss bar has a first position within the housing based on a first arrangement of the electrical components and a second position within the housing based on a second arrangement of the electrical components.

3. A power distribution module in accordance with claim 1, wherein the plurality of buss bars comprises a first buss bar having a first configuration and being positionable within a first number of channels and a second buss bar having a second configuration and being positionable within a second number of channels.

4. A power distribution module in accordance with claim 1, wherein the channels are arranged in a grid pattern having rows and columns, at least one of the buss bars received in channels within multiple columns and multiple rows.

5. A power distribution module in accordance with claim 1, wherein the buss bars are configured to bend to extend in more than one direction.

6. A power distribution module in accordance with claim 1, wherein the buss bars are removably mounted within the housing.

7. A power distribution module in accordance with claim 1, wherein the channels are discrete from one another and receive the terminals in a one-to-one relationship.

8. A power distribution module in accordance with claim 1, wherein the terminals are discrete from one another and individually coupled to a selected one of the mounts.

9. A power distribution module in accordance with claim 1, wherein the mounts represent one of a male connection and a female connection, the terminals being configured to be coupled to the mounts.

10. A power distribution module in accordance with claim 1, wherein the mounts comprise tabs extending outward from the base strip, the terminals include female connections at the end thereof for coupling to selected tabs.

11. A power distribution module in accordance with claim 1, wherein the housing comprises an upper housing and a lower housing, the upper housing having upper channel portions and the lower housing having lower channel portions, the upper and lower channel portions cooperating to define the channels, wherein the buss bars are received in both the upper and lower channel portions.

12. A power distribution module in accordance with claim 1, wherein the base strip of at least one of the buss bars has a right angle bend such that the base strip is received in both a longitudinally extending slot and in a laterally extending slot.

13. A power distribution module in accordance with claim 1, wherein the buss bar has a power connector interface to directly connect the buss bar to a power connector for the power distribution module.

14. A power distribution module in accordance with claim 1, wherein the channels extend entirely through the housing such that the channels have first and second open ends, the channels receiving a portion of the electrical components through the first open end, the channels being configured to receive a contact terminated to an end of a jumper wire through the second open end, wherein the contact is configured to be mated to the electrical component within the channel.

15. A power distribution module in accordance with claim 1, wherein the base strip includes a top and a bottom, the mounts extending from the top, the buss bar having a power connector interface at the bottom of the base strip, the power connector interface being configured to be directly connected to a power connector for the power distribution module.

16. A power distribution module in accordance with claim 1, wherein the base strip is aligned only with the respective channels receiving the terminals.

17. A power distribution module in accordance with claim 1, wherein the channels are open at a bottom of the housing, the power distribution module further comprising a set of plugs received within selected channels at the bottom of the housing to seal the selected channels.

18. A power distribution module in accordance with claim 1, wherein the buss bars are selectively positioned within the housing such that a plurality of the channels are unobstructed by any buss bar.

* * * * *